(12) United States Patent
Tanaka et al.

(10) Patent No.: US 8,962,499 B2
(45) Date of Patent: Feb. 24, 2015

(54) BASE WOVEN FABRIC FOR AIRBAG

(75) Inventors: Takeshi Tanaka, Tokyo (JP); Fumiaki Ise, Tokyo (JP); Tokio Okuno, Tokyo (JP); Masato Enoki, Tokyo (JP)

(73) Assignee: Asahi Kasei Fibers Corporation, Osaka-Shi (JP)

( * ) Notice: Subject to any disclaimer, the term of this patent is extended or adjusted under 35 U.S.C. 154(b) by 0 days.

(21) Appl. No.: 13/818,268

(22) PCT Filed: Aug. 23, 2011

(86) PCT No.: PCT/JP2011/068946
§ 371 (c)(1),
(2), (4) Date: Feb. 21, 2013

(87) PCT Pub. No.: WO2012/026455
PCT Pub. Date: Mar. 1, 2012

(65) Prior Publication Data
US 2013/0147170 A1   Jun. 13, 2013

(30) Foreign Application Priority Data
Aug. 23, 2010  (JP) .................................. 2010-186323

(51) Int. Cl.
*B60R 21/235* (2006.01)
*D03D 1/02* (2006.01)
*D06N 3/00* (2006.01)

(52) U.S. Cl.
CPC ............... *D03D 1/02* (2013.01); *B60R 21/235* (2013.01); *D06N 3/0006* (2013.01); *B60R 2021/23509* (2013.01)
USPC ........................... 442/189; 280/728.1; 442/76

(58) Field of Classification Search
CPC ............... B60R 2021/23509; B60R 21/235; D03D 1/02; D06N 3/0006
USPC ................. 280/728.1, 743.1; 442/60, 76, 189
See application file for complete search history.

(56) References Cited

U.S. PATENT DOCUMENTS 6,601,614 B1 * 8/2003 Ishii .............................. 139/389
7,438,311 B2 * 10/2008 Konishi .................... 280/730.2
(Continued)

FOREIGN PATENT DOCUMENTS

| CN | 101624739 | 1/2010 |
| CN | 101634074 | 1/2010 |

(Continued)

OTHER PUBLICATIONS

Office Action issued by the Chinese Patent Office in Chinese Patent Application No. 201180041139.5, dated Sep. 10, 2013 (9 pages).
(Continued)

*Primary Examiner* — Arti Singh-Pandey
(74) *Attorney, Agent, or Firm* — Finnegan, Henderson, Farabow, Garrett & Dunner, L.L.P.

(57) ABSTRACT

An object of the present invention is to provide a base fabric suitable for the production of a general-purpose airbag having a higher airtight performance with reduced air permeability, a high pressure resistance in the boundary portion between the inflating part and the non-inflating part, and a high impact absorption for an occupant, and a base fabric for an airbag of the present invention comprises a woven fabric formed of a multifilament synthetic fiber having a total fineness of 200 to 550 dtex and a single filament fineness of 2.0 to 7.0 dtex, wherein the elongation is, on average of warp and weft, from 5 to 15% and from 15 to 30% under loads of 50 N/cm and 300 N/cm, respectively, and the pullout resistance of the constituent yarn is from 50 to 200 N/cm/cm on average of warp and weft.

12 Claims, 4 Drawing Sheets

(56) References Cited

U.S. PATENT DOCUMENTS 7,994,076 B2 * 8/2011 Kano et al. .................... 442/158
8,642,489 B2 * 2/2014 Ise ................................ 442/228

FOREIGN PATENT DOCUMENTS

| EP | 1 433 672 | 6/2004 |
| JP | 7-42043 | 2/1995 |
| JP | 10-168700 | 6/1998 |
| JP | 11-293541 | 10/1999 |
| JP | 2001-233153 | 8/2001 |
| JP | 2001-277972 | 10/2001 |
| JP | 2002-327352 | 11/2002 |
| JP | 2003-171842 | 6/2003 |
| JP | 2004-137622 | 5/2004 |
| JP | 2004-217203 | 8/2004 |
| JP | 2004-308076 | 11/2004 |
| JP | 2006-256474 | 9/2006 |
| JP | 2009-167551 | 7/2009 |
| JP | 1009-256860 | 11/2009 |
| JP | 2010-47872 | 3/2010 |

OTHER PUBLICATIONS

English-language International Search Report from the Japanese Patent Office, mailed Sep. 27, 2011, for International Application No. PCT/JP2011/068946.

European Patent Office Communication, dated Feb. 12, 2014, with Supplemental European Search Report for EP Application No. 11819918.

Office Action in corresponding Korean Patent Application dated Jan. 24, 2014.

* cited by examiner

Fig.2
(a)
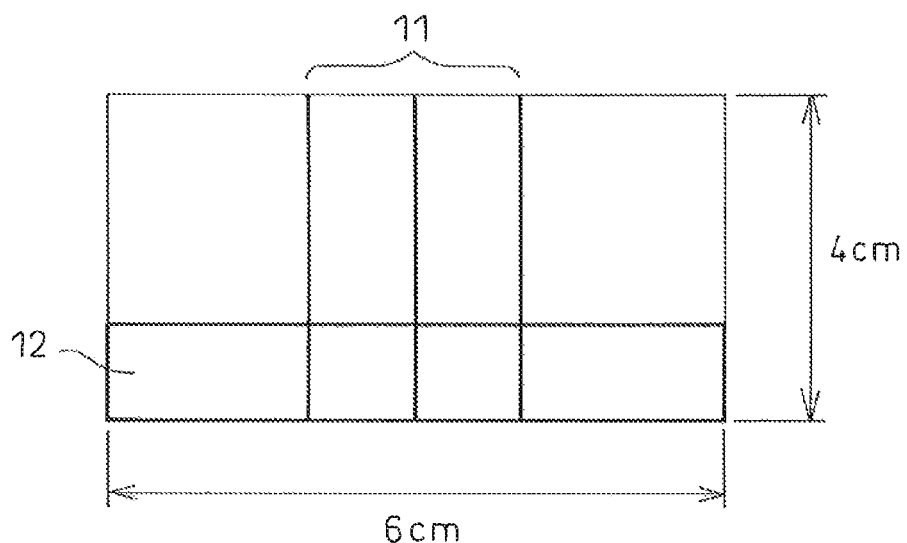
(b)
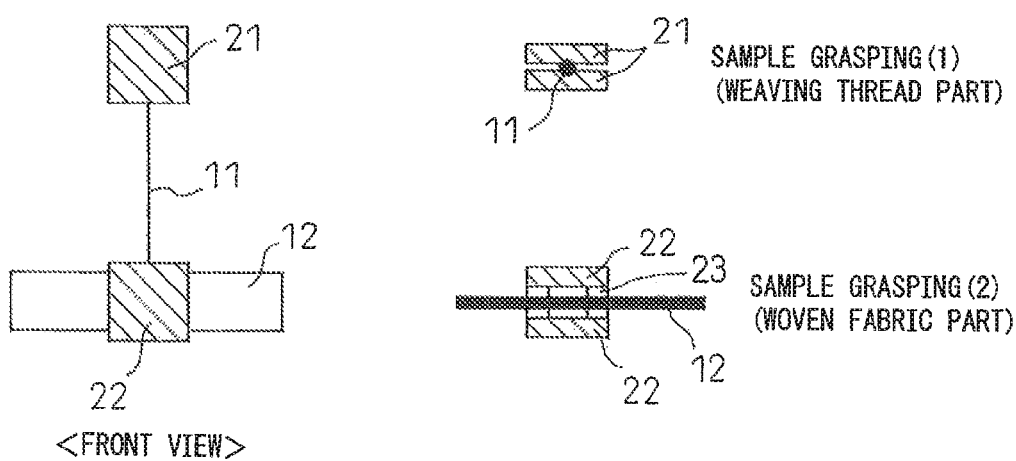

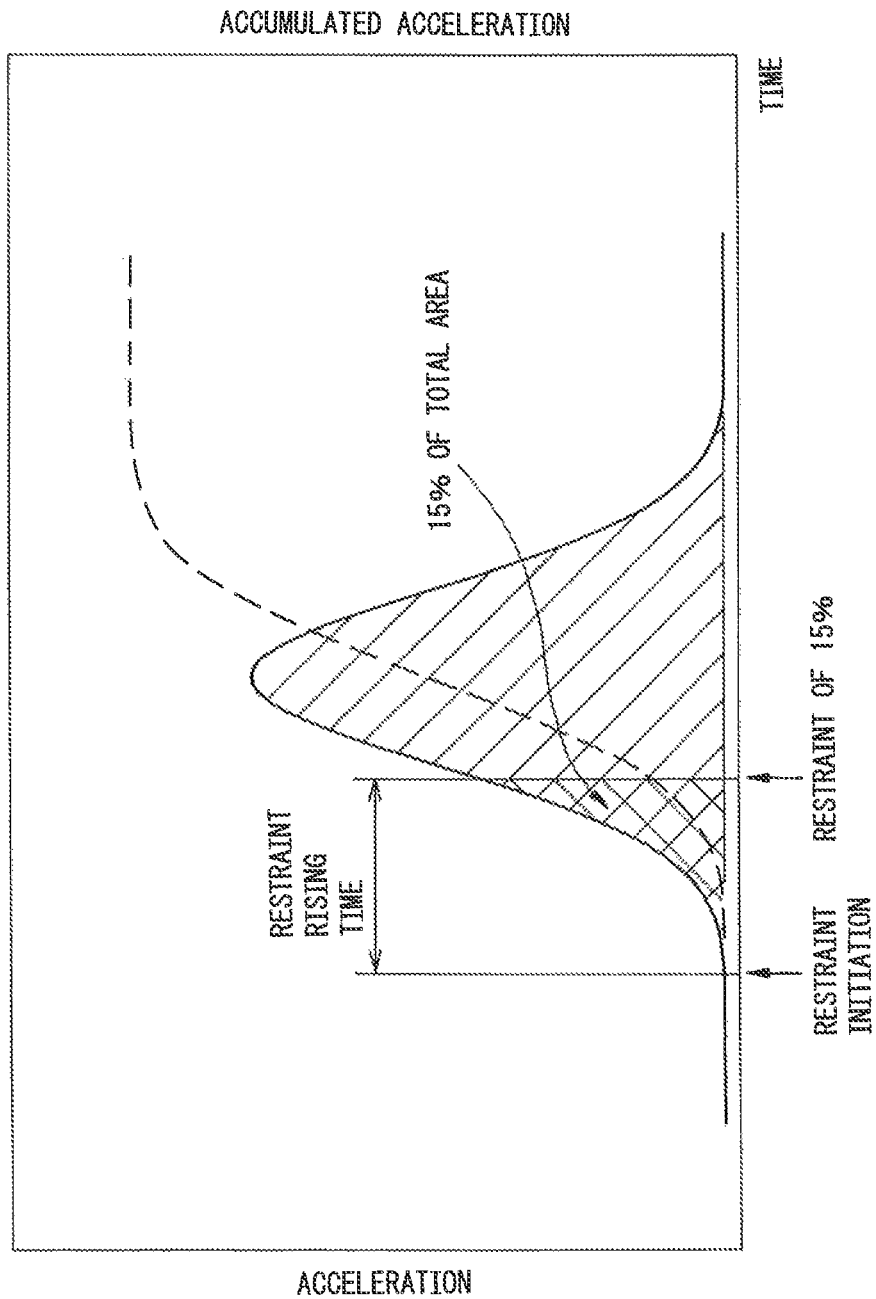

BASE WOVEN FABRIC FOR AIRBAG

TECHNICAL FIELD

The present invention relates to a base fabric composed of a synthetic fiber, particularly, a base fabric suitable for use in airbag production. More specifically, the present invention relates to a base fabric for an airbag, which is resistant to opening of texture and ensures high deployment speed.

BACKGROUND ART

From the standpoint of downsizing a vehicle and enhancing the safety, the airbags are demanded to deploy at a higher speed. Among others, in a side curtain airbag, the space between the vehicle body and the crew is small, as compared with the driver's airbag or the like and therefore, a higher deployment speed is required. For satisfying this requirement, it is necessary to reduce the weight of the bag body and minimize the leakage of the inflating-gas. Also, in a collision, even when the bag body is collapsed by the contact with the crew and the internal pressure thereof becomes higher, the airtightness of the bag body must be maintained. If the airtightness is not maintained, the deployed bag cannot receive the occupant, and the crew may be put into contact with the vehicle body and injured. That is, there is demanded a bag in which the pressure achieved at deployment (ultimate deployment pressure) is high. Furthermore, in order to quickly catch the occupant in a narrow space, i.e., to enable restraint in a limited short distance, a quick restraint property of quickly catching and restraining the occupant is demanded.

In order to realize compactness and lightweighting of an airbag, Patent Document 1 discloses use of a yarn having a low fineness and a high tenacity. However, in practice, when the crew is contacted with the bag, a stress is concentrated on the boundary portion between the inflating part and the non-inflating part and if the tenacity of the original yarn is merely increased, fibrillation of the fiber proceeds and the strength in the direction perpendicular to the fiber axis is decreased, as a result, breakage occurs in the boundary portion between the inflating part and the non-inflating part, failing in maintaining a practically sufficient bag strength. Above all, in an application requiring higher-speed deployment as in a side curtain air bag, there is a problem that the bag may burst.

As the method for improving airtightness of the bag body, Patent Document 2 discloses a method where the single filament fineness of a weaving thread is reduced to be smaller than conventional threads and the average dynamic air permeability and dynamic air permeability curve index of a plain-wovenbase fabric are set to 500 mm/s or less and 1.5 or less, respectively. However, the portion actually governing the deployment speed of the bag body is the boundary portion having a large air permeation amount, i.e., the sewn part, between the inflating part and the non-inflating part, and even when the air permeation amount of only the base fabric is reduced, which is not sufficient.

Also, Patent Document 3 discloses a hollow-woven airbag base fabric in which the air permeability in the boundary portion between the multilayered cloth part (inflating part) and the part which does not inflate (non-inflating part) of the hollow-woven fabric is set to 0.25 liter/cm/min or less under a differential pressure of 50 kPa. However, the portion actually governing the deployment speed of the bag body is the joining part of the hollow-woven fabric, where the occupant corner into contact with the deployed bag and a higher stress is thereby imposed, and under a more practical load condition, opening may be generated in the boundary portion between the inflating part and the non-inflating part at deployment depending on the yarn characteristics, leading to a large air permeation amount and a low deployment speed.

Furthermore, Patent Document 4 has proposed to control the elongation under a load of 50 N/cm of the base fabric to 15% or less and the elongation under a load of 300 N/cm of the base fabric to 30% or less in order to increase the airbag deployment speed and at the same time, control the elongation under a load of 300 N/cm of the base fabric to 15% or more so as to reduce the impact force generated when the occupant is out into contact with the air bag. However, even with these physical properties of the base fabric, a sufficient effect may not be brought out in a side curtain air bag which is required to deploy at a higher speed. In other words, the characteristics of the boundary portion between the inflating part and the non-inflating part, which is subjected to stress concentration when loaded, are important at actual deployment. Detailed studies on this portion have not yet been made and no practical technique has been proposed so far. In particular, a technique satisfying all of compactness, burst resistance and high-speed deployment has not yet been proposed.

RELATED ART

Patent Document

Patent Document 1: JP-A-2009-167551 (the term "JP-A" as used herein means an "unexamined published Japanese patent application")
Patent Document 2: JP-A-2009-256860
Patent Document 3: JP-A-2002-327352
Patent Document 4: JP-A-2003-171842

SUMMARY OF THE INVENTION

Problems to be Solved by the Invention

In order to solve those problems in conventional techniques, an object of the present invention is to provide a base fabric suitable for the production of a general-purpose airbag having a higher airtight performance with reduced air permeability, a high pressure resistance in the boundary portion between the inflating part and the non-inflating part, and a high impact absorption for an occupant. Furthermore, an object of the present invention is to provide a base fabric suitable for the production of a bag excellent in the quick restraint property of quickly cashing and restraining the occupant.

Means to Solve the Problems

As a result of intensive studies to attain the above-described objects, the present inventors have found that those objects can be attained by a base fabric composed of a multifilament synthetic fiber having a specific fineness, in which the pullout resistance of the constituent yarn is in a specific range and the elongation under a specific load is in a specific range. The present invention has been accomplished based on this finding. That is, the present invention provides the following inventions.

(1) A base fabric for an airbag, comprising a woven fabric formed of a multifilament synthetic fiber having a total fineness of 200 to 550 dtex and a single filament fineness of 2.0 to 7.0 dtex, wherein the elongation is, on average of warp and weft, from 5 to 15% and from 15 to 30% under loads of 50

N/cm and 300 N/cm, respectively, and the pullout, resistance of the constituent yarn is from 50 to 200 N/cm/cm on average of warp and weft.

(2) The base fabric according to item 1 above, wherein the ASTM D4032 bending stiffness is from 3.0 to 7.5 N.

(3) The base fabric according to item 1 or 2 above, wherein the dynamic air permeability after loading of 100 N/cm on the stitched boundary portion sewn together by the following specific sewing is 2,300 mm/s or less at a differential pressure of 50 kPa:

Specific sewing: two sheets of fabric are lock-stitched at 50 stitches/10 cm by using a twisted yarn of 1,350 dtex.

(4) The base fabric according to any one of items 1 to 3 above, wherein the cover factor (CF) represented by the following formula is from 2,000 to 2,500:

$$CF=\sqrt{[(0.9 \times d) \times (2 \times W)]}$$

(wherein d is the total fineness (dtex) on average of warp and weft of constituent yarns, and N is the weave density (yarns/2.54 cm) on average of warp and weft).

(5) The base fabric according to any one of items 1 to 4 above, wherein the elongation of the constituent yarn under a load of 4.7 cN/dtex is from 10 to 20% on average of warp and weft.

(6) The base fabric according to any one of items 1 to 5 above, wherein the strength of the constituent yarn is 7.5 cN/dtex or more on average of warp and weft.

(7) The base fabric according to any one of items 1 to 6 above, wherein a synthetic fiber having a yarn-to-yarn frictional force (P) as defined in the description of the present invention of 1.5 to 3.0 is used as the original yarn.

(8) The base fabric according to any one of items 1 to 7 above, wherein a synthetic fiber having a boiling water shrinkage percentage of 5 to 13% is used as the original yarn.

(9) The base fabric according to any one of items 1 to 8 above, wherein a synthetic fiber having a definite load elongation percentage as specified in JIS L1017 7.7 of 5 to 15% is used as the original yarn.

(10) The base fabric according to any one of items 1 to 9 above, wherein the synthetic fiber is nylon 66.

(11) The base fabric according to any one of items 1 to 10 above, having no resin coat.

(12) The base fabric according to any one of items 1 to 10 above, having a resin coat on at least one surface.

(13) An airbag comprising the base fabric according to item 11 or 12 above.

(14) The airbag according to item 13, wherein after loading a load of 100 N/cm on the boundary portion between the inflating part and the non-inflating part, the dynamic air permeability in the boundary portion between the inflating part and the non inflating part is 2,300 mm/s or less at a differential pressure of 50 kPa.

Effects of the Invention

In the case where an airbag is produced using the base fabric of the present invention, the airbag is prevented from opening of texture in the boundary portion between the inflating part and the non-inflating part under a stressed condition and can be excellent in the airtightness and pressure resistance and realize a high deployment speed. Furthermore, the gas utilization ratio is good, and the airbag does not require a high output inflator. In addition, the airbag is excellent as well in the quick restraint, property. Above all, an airbag base fabric suitable also for side curtain airbag application is provided.

BRIEF DESCRIPTION OF THE DRAWINGS

FIG. 2 A view explaining the method for measuring a pullout resistance.

FIG. 4 An explanatory view for impactor evaluation in Examples of the present invention.

MODE FOR CARRYING OUT THE INVENTION

Figure 1:
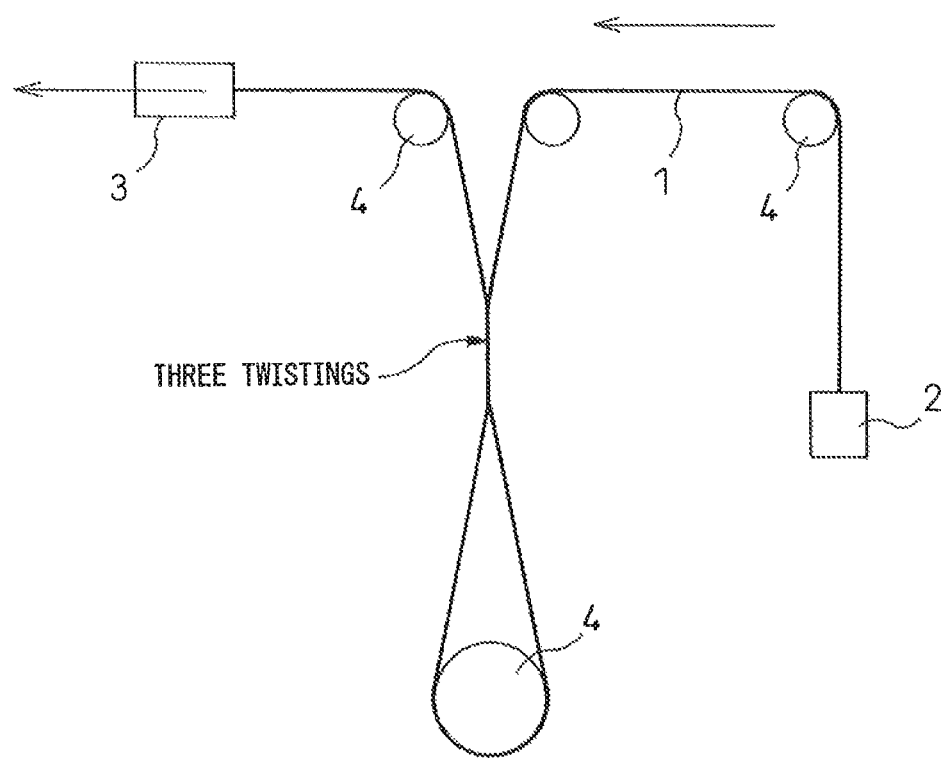
FIG. 1 A view explaining the apparatus for measuring a yarn-to-yarn frictional force.

The present invention is described in detail below.

The total fineness of the fiber constituting the base fabric is from 200 to 550 dtex, preferably from 235 to 350 dtex. With a fineness of 200 dtex or more, the base fabric can be kept from lacking tenacity, and with a fineness of 550 dtex or less, reduction in the deployment speed can be prevented. Also, when the total fineness is low, the bending stiffness of the base fabric can be kept low. The total fineness is more preferably 350 dtex or less. The single filament fineness of the fiber constituting the base fabric is from 2.0 to 7.0 dtex, preferably from 2.0 to 5.0 dtex. With a single filament fineness of 2.0 dtex or more, the filament can be prevented from damage by a sewing needle when sewn, and reduction in the tenacity of the seam part (the boundary portion between the inflating part and the non-inflating part) or breakage at deployment does not occur, and with a single filament fineness of 7.0 dtex of less, increase in the air permeation amount or decrease in the deployment speed is not caused. Also, when the singly filament fineness is low, the bending stiffness of the base fabric can be kept low. The single filament fineness is more preferably 4.0 dtex or less.

As the characteristics of the base fabric, the elongation under a load of 50 N/cm is, on average of the warp direction and the weft direction, from 5 to 15%, preferably from 7 to 12%. When the elongation under a load of 50 N/cm is 5% or more, the deployed bag can be prevented from becoming hard and failing in absorbing the impact on the occupant. In other words, it is not allowed to occur that when the occupant is caught by the airbag, the restraint itself becomes impact or injury to the occupant. When the elongation under a load of 50 N/cm is 15% or less, the deployment speed can be prevented from decreasing. Also, the elongation under a load of 300 N/cm is, on average of the warp direction and the weft direction, preferably from 15 to 30%, more preferably from 20 to 28%. When the elongation under a load of 300 N/cm is 15% or more, failure in absorbing the impact at deployment or bag breakage due to excessive convergence of a stress particularly on a specific area of the boundary portion between the inflating part and the non-inflating part is not caused. When the elongation under a load of 300 N/cm is 30% or less, opening of texture in the boundary portion between the inflating part and the non-inflating part is prevented from readily occurring at deployment and the deployment speed is not reduced. With a low elongation under a load of 300 N/cm, the tensile rigidity of the base fabric is increased, and the base fabric can deploy in good response to the gas pressure of the deployment gas. Also, with a low elongation under a load of 300 N/cm, the base fabric is less likely to be elongated under stress due to the gas pressure, and occurrence of seam opening, air permeation through seam, opening of joining part structure, or air permeation through joining part is suppressed, as a result, the ultimate deployment pressure of the airbag is increased. The elongation under loads of 50 N/cm and 300 N/cm can be reduced by using an original yarn in which the definite load elongation percentage as specified in JIS L1017 7.7 is kept low. Also, the elongation under loads of 50 N/cm and 300

N/cm can be reduced by, after weaving, raising the treatment temperature at the processing under tension or performing cooling under tension.

The definite load, elongation percentage of the original yarn for weaving a fabric is preferably from 5 to 15%, more preferably from 8 to 12%. When the definite load elongation percentage of the original yarn is 15% or less, this contributes to reducing the above-described elongation under a specific load of the base fabric.

Considering other characteristics of the original yarn, the definite load elongation percentage of the original yarn is substantially 5% or more. The constant load elongation percentage of the original yarn can be adjusted by the drawing conditions when spinning the original yarn. For example, an original, yarn in which the constant load elongation percentage as specified in JIS L1017 7.7 is kept low, is obtained by increasing the draw ratio or decreasing the drawing temperature.

A fiber spun by appropriately selecting the drawing conditions in this way is used as the original yarn, or the processing conditions after weaving are appropriately selected as above, whereby a base fabric in which the elongation under loads of 50 N/cm and 300 N/cm satisfies the above-described ranges, can be obtained.

The pullout resistance of the fiber constituting the base fabric is from 50 to 200 N/cm/cm on average of warp yarn and weft yarn. Incidentally, the measurement method is described later. The pullout resistance is preferably from 60 to 150 N/cm/cm. When the pullout resistance is 50 N/cm/cm or more, the warp yarn and weft yarn of the base fabric are prevented from readily sliding due to an outer force, and this does not readily allow for occurrence of opening of texture to cause decrease in the deployment speed. When the pullout resistance is 200 N/cm/cm or less, no local stress convergence on the constituent yarn and in turn, no airbag breakage are caused. As the pullout resistance of the constituent yarn of the base fabric is higher, seam opening of the base fabric is more reduced, leading to enhancing the airtightness of the airbag. As for the pulling resistance, in addition to the fact that the later-described yarn-to-yarn frictional, force of the constituent yarn is high, crimps of the constituent yarn have a greatly bent morphology to yield a large contact area and at the same time, the shape of the bent structure is firmly fixed, whereby the constituent yarn comes to have a large resistance value. That is, the pulling resistance of the constituent yean is affected by the oil amount or oil composition on the single filament surface of the yarn constituting the fabric, or the physical properties, particularly, shrinkage percentage or shrinkage force, of the constituent yarn. The pullout resistance is also affected by the weaving tension or temperature during processing. For example, the pullout resistance tends to be reduced in all of cases where the adhesion, amount of an oil present on the surface of a single filament constituting the base fabric is increased, where a material having a high molecular weight is used in the oil solution composition, where an original, yarn having a small shrinkage percentage or an original, yarn having a small shrinkage, force is used, where morphology relaxation by an underwater treatment is performed at the processing, where the shrinking treatment is insufficient, or where the post-treatment is performed under low tension. Preferred conditions for increasing the pullout resistance of the constituent yarn are to form a woven fabric by sufficiently developing the contraction force by the synergistic effect between the original yarn characteristics and the processing conditions, i.e., by using a high-shrinkage original yarn and at the same time, performing high-temperature dry-heat processing without passing through a warm water step.

By these controls, the pullout resistance of the constituent yarn in the range above can be achieved.

In view of deployment speed, the dynamic air permeability in the boundary portion between the inflating part and the non-inflating part of the base fabric is preferably 2,300 mm/s or less, more preferably 1,800 mm/s or less, at a differential pressure of 50 kPa after applying a stress of 100 N/cm. Here, the inflation boundary portion between the inflating part and the non inflating part of the base fabric is the seam part sewing together the base fabric panels when fabricating an airbag, or the joining part in the hollow weaving. The air permeability after loading of the inflation boundary portion is a characteristic simulating the air permeability when the airbag is inflated by gas pressure and loaded. In other words, when the air permeability after loading of the inflation boundary part is low, this means that the seam or joining part in hollow weaving exhibits low air permeability at deployment, and contributes so high-speed deployment of the airbag with no loss of the deployment gas. That is, high-speed deployment of the airbag becomes possible by combining two conditions that the air permeability after loading of the inflation boundary portion is low and that the elongation under a load of 300 N/cm is low and the tensile rigidity of the base fabric is high. Furthermore, permeation of a hot gas at the boundary part is blocked, and this is a factor in avoiding bag breakage resulting from burst attributable to heat exchange in the boundary portion. Accordingly, when the air permeability after loading of the inflation boundary portion is low, the ultimate deployment pressure of the airbag is elevated. As for the air permeability after loading of the inflation boundary portion, low air permeability can be achieved by promoting mutual restraint of constituent yarns such that opening parts are interengaged to cover each other and allow for no opening of the inflation boundary portion, in addition to making it difficult to pull out the constituent yarn. This mutual restraint of constituent yarns in the base fabric can be realized when the original yarn has tensile resistance with low elongation under a specific load in its tensile characteristics and at the same time, the texture is tightened by high-temperature treatment under tension and cooling under tension, at the processing.

The base fabric for an airbag includes a case where resin processing is applied to the base fabric surface, and a case where resin processing is not applied, but as the characteristics of the base fabric including a base fabric not subjected to resin processing, the dynamic air permeability tends to be reduced when the later-described elongation under a load of 4.7 cN/dtex of the constituent yarn is low, the pullout resistance of the constituent yarn is high, the elongation of the base fabric under loads of 50 N/cm and 300 N/cm is low, and the cover factor is high, and by adjusting these, the above-described dynamic air permeability can be achieved. Also, in the case of hollow weaving, in addition to those described above, the dynamic air permeability can be reduced when the joining part is the boundary portion in which a constituent fiber is not prone to slide under stress, as in the 2/2 basket weave. Furthermore, as for the base fabric subjected so resin processing, in addition to those described above, when the amount of resin is larger and the elongation of resin is higher, the dynamic air permeability tends to be more reduced.

In the case of subjecting an airbag fabric to resin processing, resin processing (including elastomer processing) for making the base fabric so be substantially non-air-permeable is applied. As the processing resin, for example, a silicone resin (including an elastomer) having flexibility over a wide temperature range and being excellent also in durability is preferably used.

The bending stiffness determined by measuring the base fabric for an airbag of the present invention in accordance with ASTM D4032 is preferably from 3.0 to 7.5 N. Due to a bending stiffness of 7.5 N or less, when an occupant plunges into the airbag, the airbag flexibly covers the curved surface of the occupant's body and starts receiving the plunge impact in a relatively large area. Accordingly, the timing of receiving the plunge energy is expedited, and the airbag can be of quick restraint type. The bending stiffness is the flexural rigidity of the base fabric, and in general, the bending stiffness is advantageously reduced when the total fineness of the constituent weaving thread is smaller or when the single filament fineness of the constituent weaving thread is smaller. The bending stiffness is also related to the weight per unit area of the base fabric and as the weight per unit area of the base fabric is smaller, the bending stiffness is generally lower. In the present invention, in order to satisfy at minimum the characteristics such as tensile strength of the base fabric, a minimum weight per unit area is also required, and it is preferred that the bending stiffness is substantially 3.0 N or more. Also, the quick restraint performance is a synergistic effect from combining the bending stiffness as flexural rigidity and the high-speed deployment property.

From the standpoint of satisfying both the deployment performance and the productivity, the cover factor (CF) of the base fabric is preferably from 2,000 to 2,500, more preferably from 2,100 to 2,500. For achieving a woven structure where mutual restraint of constituent yarns is increased so as to reduce the air permeability after loading in the inflation boundary portion, the cover factor is preferably higher, and a high-density fabric is preferred. Incidentally, the cover factor (CF) is represented by the following formula.

$$CF=\sqrt{[(0.9 \times d) \times (2 \times W)]}$$

(wherein d is the total fineness (dtex) on average of warp and weft of constituent yarns, and W is the weave density (yarns/2.54 cm) on average of warp and weft).

In view of the deployment speed and the occupant restraint performance, the elongation under a load of 4.7 cN/dtex of the constituent yarn is preferably from 10 to 20% on average of warp and weft. In order to reduce the elongation under a load of 300 N/cm, the elongation under a load of 4.7 cN/dtex of the constituent yarn is 20% or less and is preferably lower. The elongation under a load of 4.7 cN/dtex of the constituent yarn is preferably 10% or more, and in this range, the boundary portion between the inflating part and the non-inflating part can be prevented from breakage by the application of excessive stress. For making the elongation under a load of 4.7 cN/dtex of the constituent yarn to fall in the range above, it is preferred to optimally adjust the molecular weight of the polymer working out to the material of the fiber or the drawing conditions at spinning and thereby reduce the above-described definite load elongation percentage of the original yarn. Also from this standpoint, the definite load elongation percentage of the original yarn is preferably from 5 to 15%, more preferably from 8 to 12%. Furthermore, heat treatment under tension and cooling under tension in the processing step after weaving, are also preferred.

The strength of the constituent yarn is, on average of warp and weft, preferably 7.5 cN/dtex or more, more preferably 8.0 cN/dtex of more. The elongation at break of the constituent yarn is preferably 25% or more on average of warp and weft in view of occupant restraint property and prevention of bottoming where the bag cannot fully restrain the occupant and allows the occupant to contact with the vehicle body or the like. If the strength of the constituent yarn is less than 7.5 cN/dtex, the base fabric lacks the tenacity and cannot endure the stress at deployment of the airbag, and breakage is sometimes caused. When the elongation at break of the constituent yarn is 25% or more this makes it possible to avoid a failure in dispersing the impact at deployment, and in turn, allow for no concentration of an excessive stress particularly on the boundary portion between the in part and the non-inflating part and no bag breakage. The elongation at break can be adjusted to fall in this range by the drawing conditions or the like at spinning.

In the original yarn used, from the standpoint of preventing texture slippage at deployment, the yarn-to-yarn frictional Force is preferably from 1.5 to 3.0. When the yarn-to-yarn frictional force is high, this contributes to enhancing the pull-out resistance of the constituent yarn.

Also, the boiling water shrinkage percentage is preferably from 5 to 13%, because a high-quality base fabric with little wrinkling can be obtained. The boiling water shrinkage percentage is more preferably 7% or more, still more preferably 7.3% or more, yet still more preferably 0% or more, and is more preferably 12% or less. As the boiling water shrinkage percentage of the original yarn is higher, a higher shrinkage force is developed at the processing after weaving and a crimped structure grows, which contributes to enhancing the pullout resistance of the constituent yarn. As the high strength synthetic fiber that is a substantially available fiber, the boiling water shrinkage percentage is 13% or less.

The material of the constituent yarn constituting the base fabric is not particularly limited as long as it is a synthetic fiber, but polyamides have high tenacity and appropriate flexibility and therefore, are preferred. Furthermore, the polyamide fiber includes a fiber composed of polyamide 6, polyamide 6•6, polyamide 11, polyamide 12, polyamide 6•10, polyamide 6•12, polyamide 4•6, a copolymer thereof, and a mixture thereof. Above all, a polyamide 6•6 fiber mainly composed of a polyhexamethylene adipamide fiber is preferred. The polyhexamethylene adipamide fiber indicates a polyamide fiber consisting of 100% of hex; methylenediamine and adipic acid and having a melting point of 250° C. or more. The polyamide 6•6 fiber for use in the present invention may be a fiber composed of a polymer obtained by copolymerizing or blending polyamide 6, polyamide 6•I, polyamide 6•10, polyamide 6•T or the like with polyhexamethylene adipamide to such an extent as keeping the melting point from becoming less than 250° C. For improving the process property or enhancing the post-processing property and heat resistance performance, an additive is sometimes added to such a fiber component polymer or the surface of fiber. Examples of the additive include an antioxidant, a thermal stabilizer, a lubricating agent, and an antistatic agent.

As for the loom used at weaving, an existing loom such as waterjet loom, airjet loom and rapier loom can be applied, and as for the shedding machine, an existing apparatus such as jacquard equipment can be used, but these are not particularly limited as long as the objective base fabric can be produced.

The fabric structure is also not particularly limited, and in view of strength, a plain woven structure is preferred among others. In the case of hollow weaving, a known configuration may be used for the fabric structure configuration in the boundary portion between the bag part (inflating part) and the non-inflating part. At weaving, a sizing agent or the like may be applied, for example, to the warp yarn so as to enhance the convergence, but in view of cost, this is preferably not used.

The gray fabric after weaving is sometimes scoured and washed to remove a sizing agent, an excessive oil or contamination. However, the fabric is preferably finished into a woven fabric without scouring. It is also preferred that after most of an oil component is caused to fall off by a waterjet loom and an appropriate adhesion amount of an oil component is thereby allowed to remain, the resulting woven fabric is finished into an airbag fabric without scouring. No scouring is preferred because if the fabric is passed through hot water so as to effectively perform the washing in the scouring step, shrinkage of the fiber and, at the same time, release of the bound structure of weaving threads are involved and the pull-out resistance of the constituent yarn is reduced.

Subsequently, the woven fabric is dried and heat set, whereby the fabric can be finished into an airbag fabric. During drying and heat setting of the woven fabric, it is preferred to control, the shrinkage amount and the tension in the width of the woven fabric and the direction of the warp yarn, respectively. For example, a tenter or a drum dryer is used. In order to keep low the specific load elongation under loads of 50 N/cm and 300 N/cm in the tensile test of the woven fabric, processing is preferably performed while applying tension so as to avoid uncontrolled shrinkage in the course of a heat treatment. Also because the bound structure of weaving threads grows when the shrinkage force is sufficiently developed at a high temperature, the heating temperature is preferably 170° C. or more. Furthermore, the tension heat treatment is preferably a method that allows tension processing under control of the tension in the warp and weft directions, such as tenter method. In particular, conditions for expansion to a fixed length or more in both the warp and the weft are preferred. As the conditions of tension heat treatment, an overfeed where the warp direction becomes a shrinkage direction, and a width reduction where the weft direction becomes a shrinkage direction, are not preferred. Rather, tension conditions where both directions are an expansion direction, are preferred. The warp and weft expansion amount is preferably not a minus value (shrinkage) as the total of dimensional ratios, and expansion conditions for approximately from 0 to 5% are preferred. In addition, it is preferable that cooling immediately after heat treatment is also performed by keeping the tension. In particular, when a fixed length is kept at cooling, the woven fabric exhibits a sagging behavior and therefore, cooling is performed by keeping the tension, whereby weaving threads are strengthened in the binding structure to cover, the texture with each other and this contributes to reducing the air permeability after loading in the boundary portion. A method that allows tension processing under control of the tension in the warp and weft directions, such as tenter method, is preferred also in the cooling, and expansion conditions for more than 0% to about 5% are preferred.

EXAMPLES

The present invention is described in greater detail below by referring to Examples, but the present invention is not limited only to these Examples. Various evaluations in Examples were preformed as follows.

Incidentally, as JIS, the 1999 version was used.

(1) Boiling water shrinkage percentage of original yarn:

The original yarn was wound as a hank of 1 m, dipped in boiling water for 30 minutes, then taken out and air dried for 8 hours or more and thereafter, the contraction amount was calculated by the ratio to the original length.

(2) Yarn-to-yarn frictional force (F) of original yarn:

As shown in FIG. 1, the original yarns were twisted 1.0 three times to come in contact with each other, the take-off tension (T2) after twisting was measured by setting the load (T1) on the yarn feeding side to 140 g, and T2/T1 is defined as the frictional force F. The take-off speed at the measurement was set to 3 cm/min.

(3) Definite load elongation percentage of original yarn:
This was evaluated in accordance with JIS L1017 7.7.

(4) Elongation and tenacity of base fabric:
Measurement was performed in accordance with the JIS L1096 8.14.1 a method.

(5) Various characteristics of constituent yarn:

The worn fabric was disintegrated in accordance with JIS L1096 Appendix 14 and with respect to the constituent weaving threads of warp and weft, measurement of the crimp percentage was performed by the JIS L1096 8.7b method. Measurements of elongation and strength were performed by referring to the JIS L1017 8.5a method and setting the sample length to 200 mm and the tensile speed to 200 mm/min.

(6) Pullout resistance (2) of constituent yarn:

FIG. 2(a) shows the sample for pullout resistance measurement. In measuring the pullout resistance P (N/cm/cm) of the constituent yarn, the base fabric was cut into 4 cm height×6 cm width, weaving threads in the lateral direction were removed by leaving 15 weaving threads having a length of 6 cm in the lateral direction, and one longitudinal weaving thread for each of three portions, that is, 2 cm, 3 cm and 4 cm from the lateral end, was used as the tensile sample. Incidentally, in FIG. 2, 11 indicates three weaving threads in the longitudinal direction (selected at positions of 2 cm, 3 cm and 4 cm from the right end), and 12 indicates the woven fabric part where fifteen weaving threads in the lateral direction were left. Subsequently, as shown in FIG. 2(b), the longitudinal weaving thread tensile samples were grasped one by one by a chuck (21) capable of grasping a length of 25 mm. On the other hand, a spacer (23) was attached to the woven fabric part where weaving threads in the lateral direction remain, to stride across a width of 15 mm over the longitudinal weaving thread to be pulled out, and the woven fabric part was grasped by a chuck (22). The weaving thread was pulled out at a speed of 10 mm/min by a tensile tester, and the maximum force f(N) at this time was determined. The measurement above was performed for both the warp direction and the weft direction of the woven fabric. The pullout resistance was calculated according to the following formula as the resistance value when the warp yarns in a number corresponding to a width of 1 cm are orthogonalized with weft yarns in a number corresponding to a width of 1 cm. The same calculation was made also for the weft yarn direction.

$$P = f \times (Dx/2.54)/(15 \times 2.54/Dy)$$

(wherein f is the measured value (N), D is the weave density (threads/2.54 cm) of the measurement portion, Dy is the weave density (threads/2.54 cm) in the direction perpendicular to the measurement portion, and P is the pullout resistance value (N/cm/cm)).

In this connection, when Dx and Dy are substantially the same density, the average density may be substituted.

(7) Air permeability in the boundary portion between the inflating part and the non-inflating part (air permeability of loaded seam):

Two sheets each of 28 cm height×15 cm width were cut out as the sample base fabric, and in the case of a plain woven coat fabric, these sheets were sewn by lock stitching at 50 stitches/10 cm with a sewing thread that is a twisted yarn of 1,350 dtex, from a portion 1 cm inside the end of the long side, and the sewing thread was tied at both ends. Thereafter, the sample base fabric sewn together was opened, and each of base fabric edges with the seam at the center therebetween was grasped using a grasping jig of 6 cm×6 cm at a jig interval of 40 cm by positioning the seam at the center. A load of 1,500 N was applied to the sample at a tensile speed of 100 mm/min by using a tensile tester manufactured by A&D Company, Limited, and then the sample was once taken out. After 10 hours, the dynamic air permeability was measured. As for the dynamic air permeability, the measurement was performed around the loaded seam by using FX 3350 manufactured by TEXTEST AG at a filling pressure of 300 kPa and a filling volume of 400 cc, and the air permeability at 50 kPa was measured. With respect to the hollow-woven fabric, a piece of 28 cm height×15 cm width was cut out and after applying the same loading treatment such that the seamed part becomes a portion 1 cm inside the edge, the air permeability was measured.

(8) Bending Stiffness:

This was measured in accordance with ASTM D4032-94.

Figure 3:
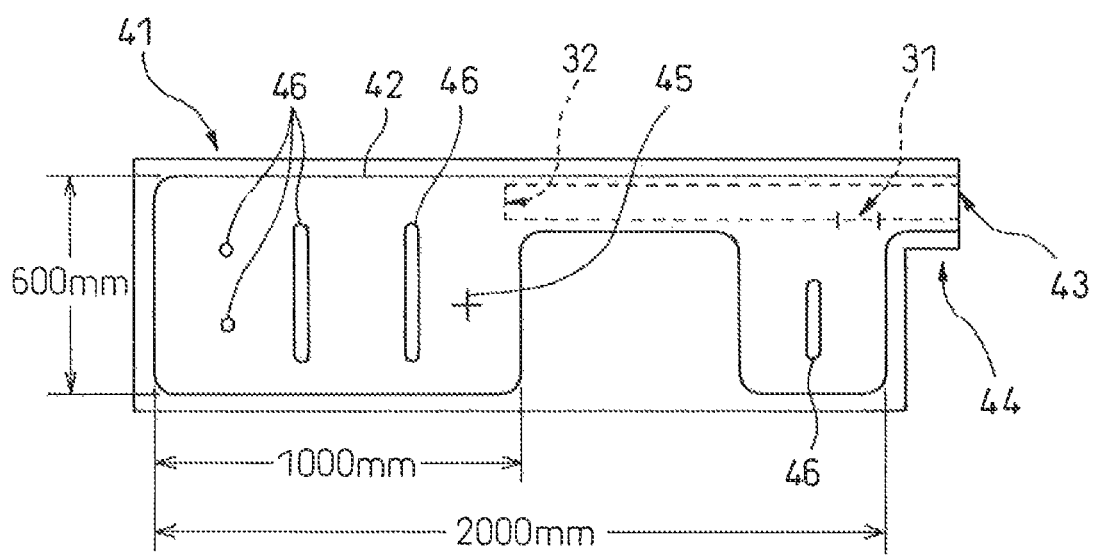
FIG. 3 A plan view of a side curtain airbag used in Examples of the present invention.

(9) Production of side curtain airbag:

In the case of a plain woven airbag fabric, a side curtain airbag having a shape shown in FIG. 3 and a volume of 24 L was sewn by two rows of lock stitching in a width of 4 mm with a sewing thread of 235 dtex/2×3 and a number of handlings of needle of 5.0 needles/cm.

An inner tube was inserted into the side curtain airbag to guide a deployment gas from the can feed port at the rear end to the front inflating part and the rear inflating part. For the inner tube, a plain woven fabric having a warp and watt density of 38×38 yarns/2.54 cm and being made of a polyamide 6.6 fiber of 700 dtex/105f, which is cloth coated with silicone of 20 q/m$^2$, was used. This cloth was cylindrically sewn on a bias to give a bore large enough to enable insertion of a gas feed port. The sewing was performed by two rows of double-thread chain stitching in a width of 7 mm with a sewing thread of 1,400 dtex at a number of handlings of needle of 36 needles/10 cm. The leading end of the inner tube is an opening, and the inner tube was provided by arranging the sewn part on the upper side and the notch port for gas feed of the rear inflating part to face downside.

(10) Deployment speed:

The side curtain airbag described in (7) above was folded into a roll form and after temporarily adhering a pressure-sensitive adhesive tape over 6 portions, the bag was horizontally set on a holding rack. The time from rapid gas introduction to completion of deployment was measured from a frame of 0.5 ms photographed by a high-speed camera by using a CGS system manufactured by Microsys Technologies Inc. As for the judgment of deployment completion, a state where the side curtain airbag expanded over the entire length of the roll form and where the deployment in the vertical direction once reached the entire deployment length over the entire horizontal length and the gas spread into the entire inflating part resulting from gas introduction, was defined as the deployment completion. The gas introduction conditions used here were such that a helium gas filled in a tank of 720 cc at 6 MPa was fed to the airbag.

(11) Inflator deployment:

The side curtain airbag described in (7) above was set on a holding rack by keeping the curtain form without folding. The airbag was deployed using a pyro inflator having a gas output of 1 mol, and the condition of the bag after deployment involving breakage was observed. Also, in order to know how the gas leaked at the deployment, the ultimate inflator gas pressure was evaluated.

(12) Overall judgment:

From the deployment speed, ultimate gas pressure and observation result after inflator deployment, samples were rated based on AA: very Good, A: good, B: fair, and C: bad.

(13) Impactor test:

The test was performed in accordance with FMVSS201. The side curtain airbag described in (7) above was set on a holding rack by keeping the curtain form without folding, A 2.0 mol stored gas inflator was fixed to the gas feed port by a hose band and the deployment, was performed. The expansion and deployment was observed from the lateral side, and a head form was caused to collide against the airbag when the expanded cross-sectional area reached 99%. That is, a head form (weight: 4.5 kg) for FMVSS201 was released at 24 km/Hr toward the center of the cushion in the driver's seat protection area of the side curtain airbag from the direction perpendicular to the curtain surface. The time course (msec) of acceleration (m/s$^2$) of impact absorption was measured by an accelerometer in the head form. In the lower part area of the "acceleration-time" curve shown in FIG. 4, the time from the restraint initiation point at which detection of acceleration of impact absorption started, to the point at which the lower part area reached 15% of the total area, was defined as the restraint, rising time, and the quick restraint property was evaluated by how short this time is, A relative value is shown by taking the case of Comparative Example 14 as 100.

Examples 1 and 2 and Comparative Examples 1 and 2

In Examples 1 and 2, the effect of total fineness was examined. A woven fabric was produced by blain weaving by using a nylon 66 multifilament original yarn having various properties shown In Table 1 and using a waterjet loom without applying a sizing agent or the like, and dried at 95° C. for 30 seconds. A silicone resin was coated on one surface in an amount of 20 g/cm$^2$ and thereafter, the coated fabric was vulcanized, at 180° C. for 2 minutes by a pin tenter under an overfeed of 1% in the warp direction and a stretch of 0% in the weft direction and then subjected to cylinder cooling at 15° C. Subsequently, the fabric was treated for 4 minutes by a pin tenter at ordinary temperature under a tension feed of 1% in the warp direction and a stretch of 1% in the weft direction, that is, in the width direction, to produce a base fabric. A side air curtain bag was produced by sewing using the obtained base fabric, and deployment speed measurement and inflator deployment were performed. The results obtained are shown in Table 1 together with the properties of the base fabric and the constituent yarn.

In Comparative Examples 1 and 2, base fabrics with the cover factor being matched to Examples 1 and 2 were produced by the same method as in Examples 1 and 2 except for using a nylon 66 multifilament original yarn having various properties shown in Table 2, and evaluated in the same manner as in Examples 1 and 2. The results obtained are shown in Table 2.

As seen from these results, the airbag where the total fineness is in the scope of the present invention exhibited a good result in both the deployment speed and the inflator deployment property, but in Comparative Example 1 where the total fineness is small, the airbag could not withstand the gas pressure and was broken. In Comparative Example 2 where the total fineness is large, the deployment speed was low.

Examples 3 and 4 and Comparative Examples 3 and 4

In Examples 3 and 4, plain woven fabrics were woven in the same manner as in Examples 1 and 2 by using the same original yarns as those of Examples 1 and 2, respectively, and setting the weave density to 74 yarns/inch in Example 3 and to 55 yarns/inch in Example 4, dried at 95° C. for 30 seconds, then heat set at 180° C. an for 1 minute, by using a tenter under an overfeed of 0% and a width reduction of 2%, and thereafter subjected to cylinder cooling at 15° C.. Furthermore, the fabric was treated for 4 minutes by a pin tenter at ordinary temperature under a tension feed of 1% in the warp direction and a stretch of 1% in the weft direction, that is, in the width direction, to obtain a base fabric without coating a silicone resin. The obtained base fabrics were evaluated in the same manner as in Examples 1 and 2. The results obtained are shown together in Table 1.

In Comparative Examples 3 and 4, plain woven fabrics were woven in the same manner as in Comparative Examples 1 and 2 by using the same original yarns as those of Comparative Examples 1 and 2, respectively, and setting the weave density to 85 yarns/inch in Comparative Example 3 and to 39 yarns/inch in Comparative Example 4, dried at 95° C. for 30 seconds, and then heat set at 180° C. for 1 minute under an overfeed of 0% and a width reduction of 2% to obtain a base fabric without coating a silicone resin. The obtained base fabrics were evaluated in the same man as in Examples 1 and 2. The results obtained are shown together in Table 2

As seen from these results, the airbag where the total fineness is in the scope of the present invention exhibited a good result in both the deployment speed and the inflator deployment property, but in Comparative Example 3 where the total fineness is small, the airbag could not withstand the gas pressure and was broken. In Comparative Example 4 where the total fineness is large, the deployment speed was low.

Example 5 and Comparative Examples 5 and 6

In Example 5, a base fabric was produced in the same manner as in Example 3 except for using a nylon 66 multifilament original yarn having a single filament fineness of 2.2 dtex. The obtained base fabric was evaluated in the same manner as in Example 1. The results obtained are shown together in Table 1. In Comparative Examples 5 and 6, base fabrics were produced and evaluated under the same conditions as in Examples 4 and 5, respectively, except for using nylon 66 multifilament original yarns having a single filament fineness of 1.7 dtex and 8.1 dtex. The results obtained are shown together in Table 2.

As seen from the results of Examples 4 and 5 and Comparative Examples 5 and 6, the airbag where the single filament fineness is in the scope of the present invention exhibited a high deployment speed, but in Comparative Example 5 where the single filament fineness is small, the airbag was broken due to crash of the sewn part. In Comparative Example 6 where the single filament fineness is large, the air permeability of loaded seam was large, and the deployment, speed and the ultimate pressure were low.

Examples 6 and 7 and Comparative Examples 7 and 8

Base fabrics were produced in the same manner as in Example 3 except for using nylon 66 multifilament original yarns shown in Tables 1 and 2, and as physical properties of the base fabric, the elongation under a load of 50 N/cm and the elongation under a load of 300 N/cm were changed. The obtained base fabrics were evaluated in the same manner as in Example 1, and the results are shown together in Tables 1 and 2.

As seen from these results, the bags where the elongation under a load of 50 N/cm and the elongation under a load of 300 N/cm are in the scope of the present invention exhibited a good result, but in Comparative Example 7, the elongations under loads of 50 N/cm and 300 N/cm of the base fabric, were large by reflecting the physical properties of the original yarn and therefore, the deployment speed and the ultimate pressure were low. In Comparative Example 8 where the boiling water shrinkage percentage of the original yarn is large, the elongations under loads of 50 N/cm and 300 N/cm of the base fabric were too small, and a stress was converged on a specific sewn pare to cause bag breakage.

Comparative Examples 9 and 10

In Comparative Example 9, a base fabric was produced in the same manner as in Example 3 except that a spinning oil on the woven fabric surface was removed with an organic solvent after woven fabric production but before heat setting. In Comparative Example 10, a base fabric was produced in the same manner as in Example 3 except that a thiodipropionic acid diolate was coated on the woven fabric surface after woven fabric production but before heat setting. The obtained base fabric was evaluated in the same manner as in Example 1, and the results obtained are shown together in Table 2. As seen from these results, in Comparative Example 9, the pullout resistance was too large and a stress was concentrated on a specific sewn part to cause airbag breakage. In Comparative Example 10, the pullout resistance was too small, and the ultimate deployment pressure was low.

Example 8

A base fabric was produced in the same manner as in Example 1 except that a nylon 46 was used as the raw material polymer of the original yarn. The obtained fabric was evaluated in the same manner as in Example 1, and the results obtained are shown together in Table 1. As apparent from Table 1, a good result was exhibited in both the deployment speed and the inflator deployment property.

Comparative Example 11

A plain woven fabric was obtained by using the nylon 66 multifilament original yarn shown in Table 2 and using a rapier loom. Subsequently, the fabric was washed for 3 minutes by cloth feeding with no loosening through a hot water bath at 80° C. containing 0.5 q/1 of sodium alkylbenzenesulfonate and 0.5 g/l of soda as dried at 130° C. for 3 minutes, heat set at 180° C. for 30 seconds under an overfeed of 0% and a width reduction of 1%, and received in a receiving box by shakedown through no active cooling to obtain a base fabric without coating a silicon resin. The obtained base fabric was evaluated in the same manner as in Example 3. The results obtained are shown in Table 2. The pullout resistance was too small, and the ultimate deployment pressure was low.

Comparative Example 12

A plain woven fabric was obtained by using the nylon 66 multifilament original yarn shown in Table 2 and using a waterjet loom without applying a sizing agent or the like, dried at 95° C. for 30 seconds, heat set at 160° C. for 1 minute under an overfeed of 2% and a width reduction of 2%, cooled by blowing wind from a fan, and received in a receiving box by shakedown to obtain a base fabric without coating a silicon resin. The obtained base fabric was evaluated in the same manner as in Examples 1 and 2. The results obtained are shown together in Table 2. The processing was not tension processing, and the pullout resistance was low. The ultimate deployment pressure was also low.

Comparative Example 13

A base fabric was produced in the same manner as in Example 3 except that the nylon 66 multifilament original yarn shown in Table 2. The obtained base was evaluated in the same manner as in Example 3. The results obtained are shown together in Table 2. A low-shrinkage original yarn was used, and the pullout resistance was low. The ultimate deployment pressure was also low.

TABLE 1

|  |  | Example 1 | Example 2 | Example 3 | Example 4 |
|---|---|---|---|---|---|
| Material |  | nylon 66 | nylon 66 | nylon 66 | nylon 66 |
| Tenacity of original yarn | N | 24 | 48 | 24 | 48 |
| Total fineness of original yarn | Dtex | 235 | 470 | 235 | 470 |
| Number of filaments of original yarn | Filaments | 72 | 72 | 72 | 72 |
| Single filament fineness of original yarn | Dtex | 3.3 | 6.5 | 3.3 | 6.5 |
| Definite load elongation percentage of original yarn | % | 9.5 | 8.8 | 9.5 | 8.8 |
| Boiling water shrinkage percentage of original yarn | % | 10.5 | 11.5 | 10.5 | 11.5 |
| Yarn-to-yarn frictional force |  | 2.3 | 2.4 | 2.3 | 2.4 |
| Total fineness of constituent yarn (average of warp and weft) | Dtex | 236 | 477 | 237 | 472 |
| Single filament fineness of constituent yarn (average of warp and weft) | Dtex | 3.3 | 6.6 | 3.3 | 6.6 |
| Tenacity of constituent yarn (average of warp and weft) | N | 21.1 | 45.8 | 21.2 | 44.2 |
| Strength of constituent yarn (average of warp and weft) | cN/dtex | 8.9 | 9.6 | 8.9 | 9.4 |
| 4.7 cN/dtex Elongation of constituent yarn (average of warp and weft) | % | 13.2 | 13.0 | 13.8 | 14.3 |
| Crimp percentage of constituent yarn (average of warp and weft) | % | 7 | 5 | 7 | 5 |
| Weave density (average of warp and weft) | yarns/inch | 70 | 49 | 74 | 55 |
| Cover factor (CF) |  | 2040 | 2031 | 2162 | 2267 |
| Pullout resistance of constituent yarn (average of warp and weft) | N/cm | 59 | 128 | 80 | 176 |
| Amount of resin coated | g/cm$^2$ | 20 | 20 | 0 | 0 |
| Tenacity of base fabric (average of warp and weft) | N/cm | 500 | 710 | 600 | 760 |
| Elongation of base fabric (average of warp and weft) | % | 35 | 36 | 38 | 36 |
| Elongation under load of 50 N/cm of base fabric (average of warp and weft) | % | 11.5 | 6.0 | 12.0 | 7.0 |
| Elongation under load of 300 N/cm of base fabric (average of warp and weft) | % | 27.2 | 17.2 | 28.3 | 19.0 |
| Air permeability in boundary portion after loading of 100 N/cm (average of warp and weft) | mm/s | 1100 | 1120 | 2000 | 1300 |
| Deployment speed | ms | 18 | 19 | 22 | 23 |
| Inflator deployment |  | no particular | no particular | no particular | no particular |
| Ultimate inflator pressure | kPa | 70 | 80 | 65 | 80 |
| Overall judgment |  | AA | AA | AA | AA |

|  |  | Example 5 | Example 6 | Example 7 | Example 8 |
|---|---|---|---|---|---|
| Material |  | nylon 66 | nylon 66 | nylon 66 | nylon 46 |
| Tenacity of original yarn | N | 24 | 24 | 24 | 23 |
| Total fineness of original yarn | dtex | 235 | 235 | 235 | 235 |
| Number of filaments of original yarn | filaments | 108 | 72 | 72 | 72 |
| Single filament fineness of original yarn | dtex | 2.2 | 3.3 | 3.3 | 3.3 |
| Definite load elongation percentage of original yarn | % | 9.5 | 8.5 | 12.0 | 10.0 |
| Boiling water shrinkage percentage of original yarn | % | 10.5 | 11.8 | 7.3 | 10.5 |
| Yarn-to-yarn frictional force |  | 2.5 | 2.5 | 2.1 | 2.3 |
| Total fineness of constituent yarn (average of warp and weft) | dtex | 238 | 235 | 236 | 236 |
| Single filament fineness of constituent yarn (average of warp and weft) | dtex | 2.2 | 3.3 | 3.3 | 3.3 |
| Tenacity of constituent yarn (average of warp and weft) | N | 20.8 | 19.9 | 18.4 | 20.5 |
| Strength of constituent yarn (average of warp and weft) | cN/dtex | 8.7 | 8.5 | 7.8 | 8.7 |
| 4.7 cN/dtex Elongation of constituent yarn (average of warp and weft) | % | 14.0 | 10.3 | 14.9 | 14.0 |
| Crimp percentage of constituent yarn (average of warp and weft) | % | 7 | 8 | 7 | 7 |
| Weave density (average of warp and weft) | yarns/inch | 74 | 74 | 74 | 72 |
| Cover factor (CF) |  | 2166 | 2152 | 2157 | 2099 |
| Pullout resistance of constituent yarn (average of warp and weft) | N/cm | 93 | 146 | 80 | 88 |
| Amount of resin coated | g/cm$^2$ | 0 | 0 | 0 | 20 |
| Tenacity of base fabric (average of warp and weft) | N/cm | 592 | 602 | 570 | 605 |
| Elongation of base fabric (average of warp and weft) | % | 35 | 32 | 40 | 32 |
| Elongation under load of 50 N/cm of base fabric (average of warp and weft) | % | 11.7 | 6.0 | 13.0 | 5.5 |
| Elongation under load of 300 N/cm of base fabric (average of warp and weft) | % | 19.2 | 16.0 | 25.0 | 16.0 |
| Air permeability in boundary portion after loading of 100 N/cm (average of warp and weft) | mm/s | 650 | 1000 | 700 | 720 |
| Deployment speed | ms | 18 | 19 | 23 | 17 |
| Inflator deployment |  | no particular | no particular | no particular | no particular |
| Ultimate inflator pressure | kPa | 70 | 75 | 65 | 65 |
| Overall judgment |  | AA | AA | A | AA |

TABLE 2

|  |  | Comparative Example 1 | Comparative Example 2 | Comparative Example 3 | Comparative Example 4 |
|---|---|---|---|---|---|
| Material |  | Nylon 66 | Nylon 66 | Nylon 66 | Nylon 66 |
| Tenacity of original yarn | N | 18 | 95 | 18 | 95 |
| Total fineness of original yarn | dtex | 175 | 940 | 175 | 940 |
| Number of filaments of original yarn | filaments | 40 | 214 | 40 | 214 |
| Single filament fineness of original yarn | dtex | 4.4 | 4.4 | 4.4 | 4.4 |
| Definite load elongation percentage of original yarn | % | 11.0 | 11.5 | 11.0 | 11.5 |

TABLE 2-continued

|  |  |  |  |  |  |
|---|---|---|---|---|---|
| Boiling water shrinkage percentage of original yarn | % | 9.0 | 8.5 | 9.0 | 8.5 |
| Yarn-to-yarn frictional force |  | 2.5 | 2.4 | 2.5 | 2.4 |
| Total fineness of constituent yarn (average of warp and weft) | dtex | 177 | 943 | 180 | 942 |
| Single filament fineness of constituent yarn (average of warp and weft) | dtex | 4.4 | 4.4 | 4.5 | 4.4 |
| Tenacity of constituent yarn (average of warp and weft) | N | 15 | 90 | 15 | 90 |
| Strength of constituent yarn (average of warp and weft) | cN/dtex | 8.5 | 9.5 | 8.3 | 9.6 |
| 4.7 cN/dtex Elongation of constituent yarn (average of warp and weft) | % | 13.5 | 13.0 | 14.0 | 14.3 |
| Crimp percentage of constituent yarn (average of warp and weft) | % | 8 | 5 | 8 | 5 |
| Weave density (average of warp and weft) | yarns/inch | 81 | 35 | 85 | 39 |
| Cover factor (CF) |  | 2033 | 2036 | 2133 | 2269 |
| Pullout resistance of constituent yarn (average of warp and weft) | N/cm | 59 | 167 | 65 | 207 |
| Amount of resin coated | g/cm² | 20 | 20 | 0 | 0 |
| Tenacity of base fabric (average of warp and weft) | N/cm | 400 | 1100 | 420 | 1300 |
| Elongation of base fabric (average of warp and weft) | % | 34 | 32 | 38 | 40 |
| Elongation under load of 50 N/cm of base fabric (average of warp and weft) | % | 19.7 | 4.1 | 8.0 | 14.5 |
| Elongation under load of 300 N/cm of base fabric (average of warp and weft) | % | 29.1 | 15.1 | 29.0 | 18.0 |
| Air permeability in boundary portion after loading of 100 N/cm (average of warp and weft) | mm/s | 1320 | 600 | 2600 | 1450 |
| Deployment speed | ms | burst | 30 | burst | 31 |
| Inflator deployment |  | crash of sewn part | no particular | crash of sewn part | no particular |
| Ultimate inflator pressure | kPa | — | 80 | — | 80 |
| Overall judgment |  | C | C | C | C |

|  |  | Comparative Example 5 | Comparative Example 6 | Comparative Example 7 | Comparative Example 8 |
|---|---|---|---|---|---|
| Material |  | Nylon 66 | Nylon 66 | Nylon 66 | Nylon 66 |
| Tenacity of original yarn | N | 22 | 45 | 20 | 24 |
| Total fineness of original yarn | dtex | 235 | 470 | 235 | 235 |
| Number of filaments of original yarn | filaments | 136 | 58 | 72 | 72 |
| Single filament fineness of original yarn | dtex | 1.7 | 8.1 | 3.3 | 3.3 |
| Definite load elongation percentage of original yarn | % | 9.7 | 11.2 | 12.5 | 7.5 |
| Boiling water shrinkage percentage of original yarn | % | 10.3 | 8.8 | 8.0 | 13.0 |
| Yarn-to-yarn frictional force |  | 2.3 | 2.4 | 1.8 | 2.3 |
| Total fineness of constituent yarn (average of warp and weft) | dtex | 236 | 475 | 237 | 237 |
| Single filament fineness of constituent yarn (average of warp and weft) | dtex | 1.7 | 8.2 | 3.3 | 3.3 |
| Tenacity of constituent yarn (average of warp and weft) | N | 20 | 42 | 16 | 20 |
| Strength of constituent yarn (average of warp and weft) | cN/dtex | 8.5 | 8.8 | 6.8 | 8.4 |
| 4.7 cN/dtex Elongation of constituent yarn (average of warp and weft) | % | 14.5 | 14.0 | 17.0 | 10.0 |
| Crimp percentage of constituent yarn (average of warp and weft) | % | 7 | 6 | 7 | 10 |
| Weave density (average of warp and weft) | yarns/inch | 74 | 55 | 74 | 74 |
| Cover factor (CF) |  | 2152 | 2262 | 2152 | 2152 |
| Pullout resistance of constituent yarn (average of warp and weft) | N/cm | 93 | 59 | 93 | 199 |
| Amount of resin coated | g/cm² | 0 | 0 | 0 | 0 |
| Tenacity of base fabric (average of warp and weft) | N/cm | 580 | 780 | 440 | 600 |
| Elongation of base fabric (average of warp and weft) | % | 35 | 36 | 43 | 30 |
| Elongation under load of 50 N/cm of base fabric (average of warp and weft) | % | 8.2 | 7.2 | 15.3 | 4.2 |
| Elongation under load of 300 N/cm of base fabric (average of warp and weft) | % | 26.7 | 21.0 | 35.0 | 12.0 |
| Air permeability in boundary portion after loading of 100 N/cm (average of warp and weft) | mm/s | 2300 | 2700 | 2600 | 1870 |
| Deployment speed | ms | burst | 30 | 30 | burst |
| Inflator deployment |  | crash of sewn part | no particular | no particular | crash of sewn part |
| Ultimate inflator pressure | kPa | — | 40 | 45 | — |
| Overall judgment |  | C | C | C | C |

|  |  | Comparative Example 9 | Comparative Example 10 | Comparative Example 11 | Comparative Example 12 | Comparative Example 13 |
|---|---|---|---|---|---|---|
| Material |  | Nylon 66 | Nylon 66 | Nylon 66 | Nylon 66 | Nylon 66 |
| Tenacity of original yarn | N | 24 | 24 | 24 | 20 | 20 |
| Total fineness of original yarn | dtex | 235 | 235 | 235 | 235 | 235 |
| Number of filaments of original yarn | filaments | 72 | 72 | 72 | 72 | 72 |
| Single filament fineness of original yarn | dtex | 3.3 | 3.3 | 3.3 | 3.3 | 3.3 |
| Definite load elongation percentage of original yarn | % | 9.5 | 9.8 | 12.8 | 12.5 | 13.8 |
| Boiling water shrinkage percentage of original yarn | % | 10.5 | 10.2 | 7.2 | 8.0 | 6.5 |
| Yarn-to-yarn frictional force |  | 3.2 | 1.2 | 1.8 | 1.8 | 1.8 |
| Total fineness of constituent yarn (average of warp and weft) | dtex | 235 | 235 | 243.5 | 237 | 237 |
| Single filament fineness of constituent yarn (average of warp and weft) | dtex | 3.3 | 3.3 | 3.4 | 3.3 | 3.3 |
| Tenacity of constituent yarn (average of warp and weft) | N | 19 | 19 | 19.7 | 16 | 16 |
| Strength of constituent yarn (average of warp and weft) | cN/dtex | 8.1 | 8.1 | 8.1 | 6.8 | 6.8 |
| 4.7 cN/dtex Elongation of constituent yarn (average of warp and weft) | % | 14.0 | 13.6 | 13.5+ | 17.0 | 14.5 |
| Crimp percentage of constituent yarn (average of warp and weft) | % | 7 | 8 | 6.85 | 8.5 | 6 |
| Weave density (average of warp and weft) | yarns/inch | 74 | 75 | 75 | 74 | 74 |

TABLE 2-continued

|  |  |  |  |  |  |  |
|---|---|---|---|---|---|---|
| Cover factor (CF) |  | 2152 | 2181 | 2221 | 2162 | 2162 |
| Pullout resistance of constituent yarn (average of warp and weft) | N/cm | 426 | 27 | 45 | 45 | 40 |
| Amount of resin coated | g/cm$^2$ | 0 | 0 | 0 | 0 | 0 |
| Tenacity of base fabric (average of warp and weft) | N/cm | 570 | 610 | 600 | 440 | 600 |
| Elongation of base fabric (average of warp and weft) | % | 30 | 41 | 37 | 43 | 35 |
| Elongation under load of 50 N/cm of base fabric (average of warp and weft) | % | 6.6 | 7.8 | 8.5 | 16.0 | 10.0 |
| Elongation under load of 300 N/cm of base fabric (average of warp and weft) | % | 27.6 | 28.1 | 24.0 | 35.0 | 16.0 |
| Air permeability in boundary portion after loading of 100 N/cm (average of warp and weft) | mm/s | 1770 | 3000 | 2600 | 2800 | 2600 |
| Deployment speed | ms | burst | 33 | 30 | 30 | 31 |
| Inflator deployment |  | crash of sewn part | no particular | no particular | no particular | no particular |
| Ultimate inflator pressure | kPa | — | 40 | 45 | 40 | 45 |
| Overall judgment |  |  | C | C | C | C |

Comparative Example 14

Evaluation of bending stiffness was performed using the base fabric described in Comparative Example 6. Also, the impactor restraint rising time was evaluated and used as the basis. The results are shown in Table 3.

Example 10

The bending stiffness and the impactor restraint rising time were evaluated using the base fabric described in Example 3. The results are shown together in Table 3. The bending stiffness exhibited flexibility, and the impactor restraint rising time was short.

Examples 11 and 12

A base fabric was produced in the same manner as in Example 3 by using the nylon 66 multifilament original yarn shown in Table 3, and the obtained base fabric was evaluated in the same manner as in Example 3 and also evaluated for the bending stiffness and the impactor restraint rising time. The results are shown together in Table 3. The bending stiffness exhibited flexibility, and the impactor restrains rising time was short.

TABLE 3

|  |  | Comparative Example 14 | Example 10 | Example 11 | Example 12 |
|---|---|---|---|---|---|
| Material |  | Nylon 66 | Nylon 66 | Nylon 66 | Nylon 66 |
| Tenacity of original yarn | N | 45 | 24 | 24 | 48 |
| Total fineness of original yarn | dtex | 470 | 235 | 235 | 470 |
| Number of filaments of original yarn | filaments | 58 | 72 | 36 | 144 |
| Single filament fineness of original yarn | dtex | 8.1 | 3.3 | 6.5 | 3.3 |
| Definite load elongation percentage of original yarn | % | 11.2 | 9.5 | 8.5 | 7.5 |
| Boiling water shrinkage percentage of original yarn | % | 8.8 | 10.5 | 10.5 | 11.5 |
| Yarn-to-yarn frictional force |  | 2.4 | 2.3 | 2.3 | 2.5 |
| Total fineness of constituent yarn (average of warp and weft) | dtex | 475 | 237 | 237 | 490 |
| Single filament fineness of constituent yarn (average of warp and weft) | dtex | 8.2 | 3.3 | 6.6 | 3.4 |
| Tenacity of constituent yarn (average of warp and weft) | N | 42 | 21.2 | 21.2 | 41.7 |
| Strength of constituent yarn (average of warp and weft) | cN/dtex | 8.8 | 8.9 | 8.9 | 8.5 |
| 4.7 cN/dtex Elongation of constituent yarn (average of warp and weft) | % | 14.0 | 13.8 | 13.8 | 15.0 |
| Crimp percentage of constituent yarn (average of warp and weft) | % | 6 | 7 | 7.5 | 4.0 |
| Weave density (average of warp and weft) | yarns/inch | 55 | 74 | 74 | 51.5 |
| Cover factor (CF) |  | 2262 | 2162 | 2162 | 2163 |
| Pullout resistance of constituent yarn (average of warp and weft) | N/cm | 59 | 80 | 65 | 185 |
| Amount of resin coated | g/cm$^2$ | 0 | 0 | 0 | 0 |
| Tenacity of base fabric (average of warp and weft) | N/cm | 780 | 600 | 610 | 751 |
| Elongation of base fabric (average of warp and weft) | % | 36 | 38 | 40 | 36 |
| Elongation under load of 50 N/cm of base fabric (average of warp and | % | 7.2 | 12.0 | 12.5 | 10.5 |
| Elongation under load of 300 N/cm of base fabric (average of warp and weft) | % | 21.0 | 28.3 | 28.5 | 20.0 |
| Air permeability in boundary portion after loading of 100 N/cm (average of warp and weft) | mm/s | 2700 | 2000 | 2200 | 800 |
| Deployment speed | ms | 30 | 22 | 25 | 20 |
| Inflator deployment |  | no particular | no particular | no particular | no particular |
| Ultimate inflator pressure | kPa | 40 | 65 | 55 | 80 |
| Overall judgment |  | C | AA | AA | AA |
| Bending stiffness (average of warp and weft) |  | 8.3 | 5 | 5.5 | 7.4 |
| Impactor restraint rising time |  | 100 | 80 | 83 | 93 |

INDUSTRIAL APPLICABILITY

The airbag made of the base fabric of the present invention is prevented from opening of texture in the boundary portion between the inflating part and the non-inflating part under a stressed condition and exhibits excellent pressure resistance and a high deployment speed.

DESCRIPTION OF REFERENCE NUMERALS

1 Yarn
2 Weight (T1)
3 Load cell (T2)
4 Pulley
11 Three weaving threads in the longitudinal direction
12 Woven fabric part where fifteen weaving threads in the lateral direction are left
21 Chuck
22 Chuck
23 Spacer
31 Opening notch part
32 Opening notch part
41 Side curtain airbag
42 Bag boundary portion
43 Inner tube
44 Inflator fixing part
45 Central region of protection area
46 Joining portion.

The invention claimed is:

1. A base fabric for an airbag, comprising a woven fabric formed of a multifilament synthetic fiber having a total fineness of 200 to 550 dtex and a single filament fineness of 2.0 to 7.0 dtex, wherein the original yarn used is a polyamide 6.6 fiber having a boiling water shrinkage percentage of 7.3% to 13%, the elongation is, on average of warp and weft, from 5 to 15% and from 15 to 30% under loads of 50 N/cm and 300 N/cm, respectively, and the pullout resistance of the constituent yarn is from 50 to 200 N/cm/cm on average of warp and weft, and the dynamic air permeability after loading of 100 N/cm the stitched boundary portion sewn together by the following specific sewing is 2,300 mm/s or less at a 50 kPa:

Specific sewing: two sheets of fabric are lock-stitched at 50 stitches/10 cm by using a twisted yarn of 1,350 dtex.

2. The base fabric according to claim 1, wherein the ASTM D4032 bending stiffness is from 3.0 to 7.5 N.

3. The base fabric according to claim 1, wherein the cover factor (CF) represented by the following formula is from 2,000 to 2,500:

$$CF = \sqrt{[(0.9 \times d) \times (2 \times W)]}$$

(wherein d is the total fineness (dtex) on average of warp and weft of constituent yarns, and W is the weave density (yarns/2.54 cm) on average of warp and weft).

4. The base fabric according to claim 1, wherein the elongation of the constituent yarn under a load of 4.7 cN/dtex is from 10 to 20% on average of warp and weft.

5. The base fabric according claim 1, wherein the strength of the constituent yarn is 7.5 cN/dtex or more on average of warp and weft.

6. The base fabric according to claim 1, wherein a synthetic fiber having a yarn-to-yarn frictional force (P) as defined in the description of the present invention of 1.5 to 3.0 is used as the original yarn.

7. The base fabric according to claim 1, wherein a synthetic fiber having a boiling water shrinkage percentage of 5 to 13% is used as the original yarn.

8. The base fabric according to claim 1, wherein a synthetic fiber having a definite load elongation percentage as specified in JIS L1017 7.7 of 5 to 15% is used as the original yarn.

9. The base fabric according to claim 1, having no resin coat.

10. The base fabric according to claim 1, having a resin coat on at least one surface.

11. An airbag comprising the base fabric according to claim 1,

12. The airbag according to claim 11, wherein after loading a load of 100 N/cm on the boundary portion between the inflating part and the non-inflating part, the dynamic air permeability in the boundary portion between the inflating part and the non-inflating part is 2,300 mm/s or less at a differential pressure of 50 kPa.

* * * * *

UNITED STATES PATENT AND TRADEMARK OFFICE
CERTIFICATE OF CORRECTION

PATENT NO. : 8,962,499 B2  
APPLICATION NO. : 13/818268  
DATED : February 24, 2015  
INVENTOR(S) : Takeshi Tanaka et al.

Page 1 of 1

It is certified that error appears in the above-identified patent and that said Letters Patent is hereby corrected as shown below:

In the Claims

Claim 1, Col. 21, line 33, "6.6" should read --6·6--.

Claim 11, Col. 22, line 33, "1," should read --1.--.

Signed and Sealed this  
Twenty-fifth Day of August, 2015

Michelle K. Lee  
*Director of the United States Patent and Trademark Office*